June 16, 1931.   R. AUDUBERT   1,810,458
MOTOR CAR FILTER SYSTEM
Filed May 4, 1928
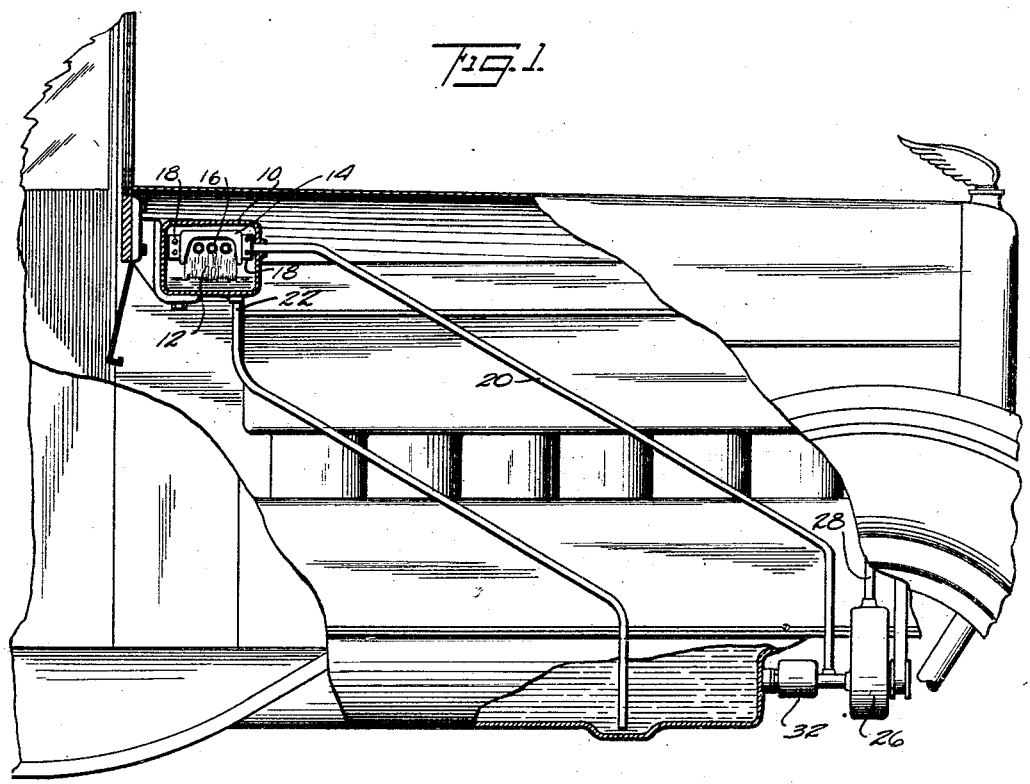
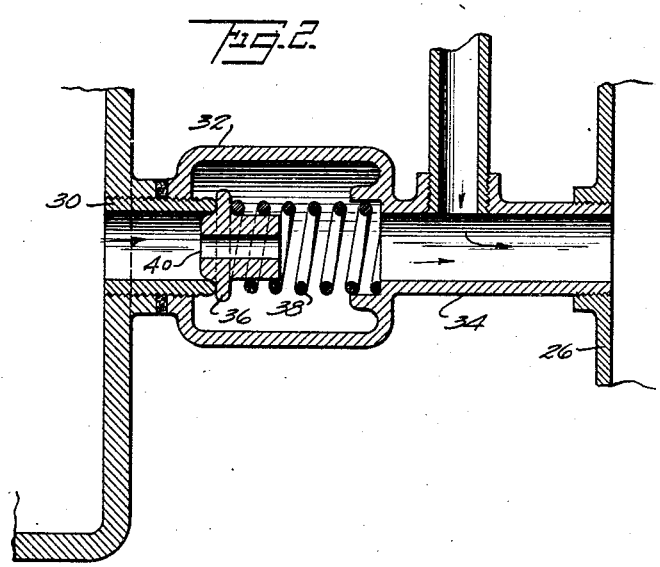
INVENTOR
Rene Audubert
BY Cruse Shwarm
ATTORNEYS.

Patented June 16, 1931

1,810,458

UNITED STATES PATENT OFFICE

RENÉ AUDUBERT, OF PARIS, FRANCE, ASSIGNOR TO SOCIETE ANONYME DES PROCEDES R. AUDUBERT, OF PARIS, FRANCE, A CORPORATION OF FRANCE

MOTOR CAR FILTER SYSTEM

Application filed May 4, 1928. Serial No. 275,140.

In my co-pending application, Ser. No. 259,705, filed March 7, 1928, I describe a form of filter which is to be operated by having the liquid flow through it under a very slight pressure differential. One of the simplest ways of supplying such pressure differential is by gravity suction.

Heretofore when filters have been applied to automobiles for filtering the crankcase oil, it has been customary to force the oil by a pump from the crankcase into the filter and force it through the filtering plates. In the case where the automobile has a forced-feed lubricating system, the regular pump is used with all or part of the oil by-passed through the filter and the rest sent to the moving parts of the engine.

According to the present invention, a filter which is adapted for use with a very small pressure differential, such as may be supplied by gravity suction, is built into an automobile in such a way that the oil is fed into the filter and flows through and out of the filter at least in part by the force of gravity, and no pressure other than the normal pressure of the atmosphere is utilized for forcing the oil through the filtering medium.

In the case of forced feed lubrication where an oil pump is used, the discharge line from the filter is, for the purposes of this invention, preferably connected to the intake of the pump. It is of course understood that the filter is not intended to handle the full amount of oil handled by the pump so the intake is also connected to the oil reservoir in the crankcase. The inlet from the crankcase may be proportioned so that it is small enough to maintain slightly sub-atmospheric pressure in the intake line through which the filter is connected. However, I prefer to have the intake connection from the pump to the crankcase amply large to supply the pump with its full need of oil at all times but to insert in this intake line a valve which will open against a slight pressure so that the suction on the filter may be substantially constant at all times. If this filter is positioned a substantial distance above the crankcase, as for example on the back of the dashboard, the suction need only be enough to raise the oil to fill the filter and start it in operation, for the filter in this case is in a closed system and the down flow from the filter will supply a sufficient additional suction to cause the filter to operate efficiently. The connections are preferably made so that the oil which is withdrawn from the crankcase and passed through the filter comes from the bottom of the crankcase where the oil is apt to be the dirtiest, particularly when the car is first started up, while the oil drawn directly into the pump may come from a point higher up in the crankcase. By this arrangement, any sediment which collects in the crankcase when the car is not in use will be drawn into the filter, as soon as the car is started into operation and not carried to the engine. Also the cleaned oil from the filter is all being delivered directly to the engine without being deposited back in the crankcase.

When desired, as where no oil pump is provided, the oil can be drawn up to the filter by suction from the intake manifold of the engine. For example, one may use a device similar to the well-known vacuum tank now utilized for supplying gasoline to the carburetor, and allow the oil to flow from such tank into the filter. In this case the oil will flow through the filter by gravity and the discharge will act as a syphon to accelerate the flow. Under some circumstances the oil may be drawn through the filter in its upward movement and allowed to flow from the tank back to the crankcase.

If it is desired to utilize the gravity flow and supply the oil to the filter from the pressure side of the oil pump, the oil may be forced up to the usual oil pressure gauge on the dash-board and allowed to flow into a filter tank, which tank is preferably supplied with an overflow pipe connected with the crankcase, so that it may be impossible to build up pressure in the filter, or back pressure on the gauge.

My invention is illustrated in the accompanying drawings, in which Fig. 1 is a diagrammatic view showing a portion of the crankcase and filter and connections in section, and Fig. 2 is an enlarged detail of the inlet valve connection to the oil pump.

The filter here illustrated is of the type described in my copending application, Ser. No. 259,705, filed March 7, 1928. This filter comprises the casing 10, in which is positioned the filtering body 12 made up of a series of layers of fabric woven in a manner similar to ordinary wicking. The upper edges and upper portions of the sides of these pieces of fabric are engaged between metal plates 14 so that such upper edge portions may be squeezed tightly together. Through the wicking run pipes 16 which are open at the bottom and connected to a header 18 to which is attached the discharge pipe 20. An inlet pipe 22 is adapted to supply oil to the casing 10 from the bottom part of the crankcase 24.

A pump 26 supplies oil to the bearings, etc. of the engine through the pipe 28 and draws oil from the crankcase 24 through the pipe 30. A valve 32 is connected with the pipe 30 which in turn is connected to the pump 26 by the pipe 34 to which the pipe 20 is connected.

As shown in Fig. 2, the valve 32 makes threaded engagement with the pipe 30 so that the pipe 30 may be screwed in or out of the valve and the end of the pipe 30 is here shown as forming the valve seat, for it is not necessary that this valve be closed tightly. A movable member 36 is held in place on the end of the pipe 30 by a spring 38 and a means is provided whereby oil may flow through this valve even when the same is closed; for example, a hole 40 may be formed in the removable member 36. It is the intention that the opening 40 will not be able to supply all of the oil demanded by the pump when the same is running at normal speed but will supply sufficient oil to keep the pump primed. Accordingly, when the pump is running, suction will be exerted tending to move the member 36 and also exerting suction tending to draw oil up through the pipe 22 into the filter casing 10. As this suction need only be enough to fill the filter casing 10, the spring 38 may be set to exert very slight pressure, such for example, as a pressure of one pound per square inch.

As soon as the engine is started in operation, the pump 26 will draw oil from the crankcase 24 and suction will be exerted sufficient to fill the filter casing 10. The oil will flow upward through the filtering body 12 and out through the pipe 16 into the header 18 and thus down through the pipe 20. As soon as the pipe 20 is filled, gravity flow in this pipe will supplement the suction of the pump on this pipe and cause sufficient velocity to flow through the filtering body 12. The dirtiest oil will be drawn up through the pipe 22, filtered and delivered directly to the pump 26 as clean oil, supplementing the flow of relatively clean oil drawn from the crankcase through the pipe 30. As a filter of the type described is highly efficient, the oil will be kept practically clean and if any sediment forms in the oil, this will tend to settle when the engine is at rest and will be drawn into the filter.

It is to be understood that this example is given only by way of illustration, and that many modifications may be made as have already been suggested.

What I claim is:

In combination with an internal combustion engine, an oil reservoir, a filter, a pump, an oil supply line for the filter running from the reservoir, an oil discharge line for the filter connected with the intake of the pump, and means for maintaining a substantially uniform degree of sub-atmospheric pressure in said discharge line when the pump is operating, sufficient to cause the oil to be sucked up said supply line to said filter, the intake at said pump being also connected with the oil reservoir by a pipe provided with a valve adapted to maintain sub-atmospheric pressure in said oil discharge line when the pump is in operation.

RENÉ AUDUBERT.